Figures 1, 2, 14:
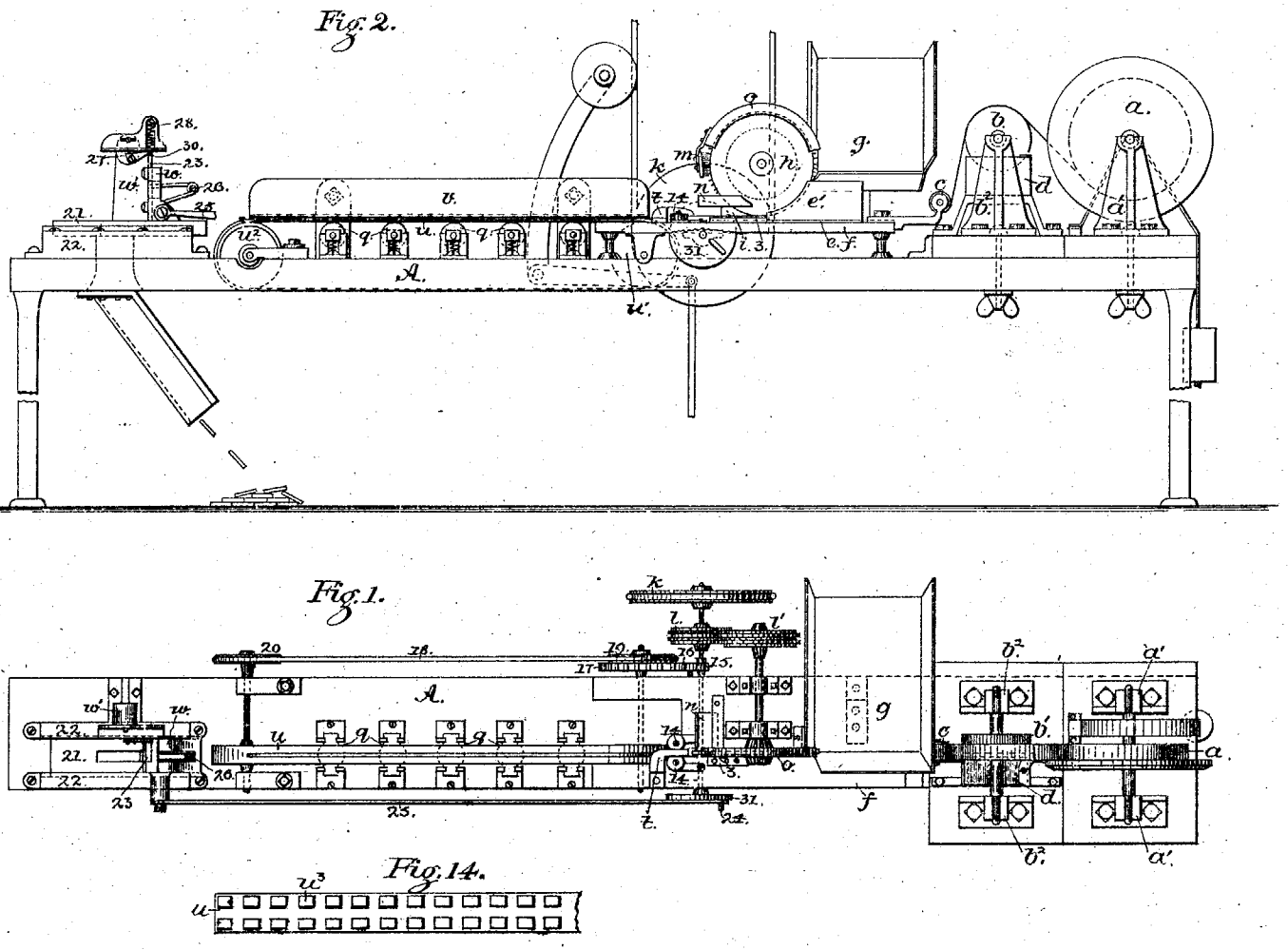

J. BURNS & A. BUCKMAN. 3 Sheets—Sheet 1.

Assignors of part interest to J. S. BAKER, A. L. SCHERMERHORN, J. R. DOWNE & F. P. HARDER.

CIGARETTE MACHINE.

No. 10,428. Reissued Dec. 18, 1883.

*Witnesses:*

S. B. Brewer,

A Low

*Inventors:*

JAMES BURNS, - AND -

ALEXANDER BUCKMAN,

William N. Low,

Attorney.

J. BURNS & A. BUCKMAN. 3 Sheets—Sheet 2.

Assignors of part interest to J. S. BAKER, A. L. SCHERMERHORN, J. R. DOWNE & F. P. HARDER.

CIGARETTE MACHINE.

No. 10,428. Reissued Dec. 18, 1883.

Witnesses:
S. B. Brewer,
A Low

Inventors:
JAMES BURNS, AND
ALEXANDER BUCKMAN,
by William H. Low,
Attorney.

J. BURNS & A. BUCKMAN. 3 Sheets—Sheet 3.
Assignors of part interest to J. S. BAKER, A. L. SCHERMERHORN, J. R. DOWNE & F. P. HARDER.
CIGARETTE MACHINE.
No. 10,428. Reissued Dec. 18, 1883.
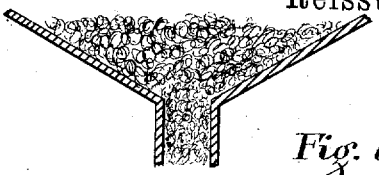
Fig. 6.
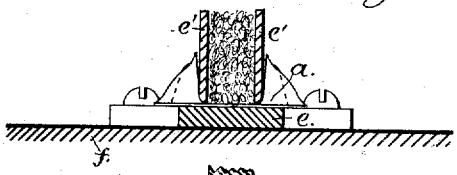
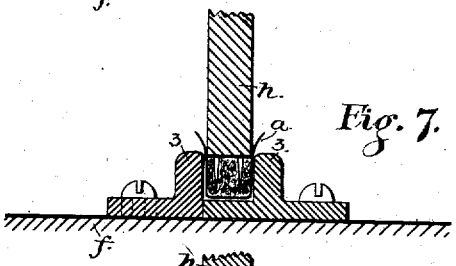
Fig. 7.
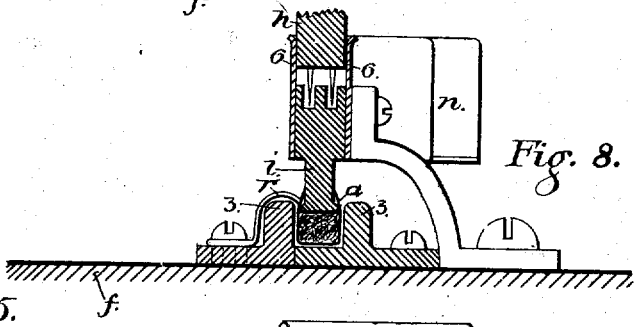
Fig. 8.
Fig. 15.
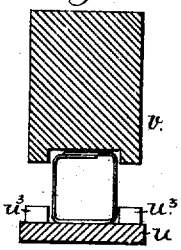
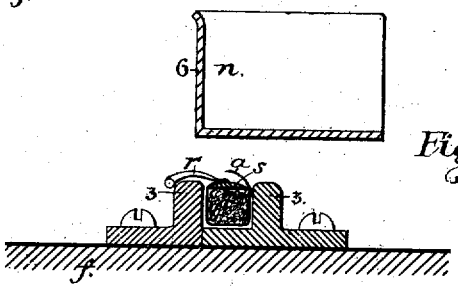
Fig. 9.
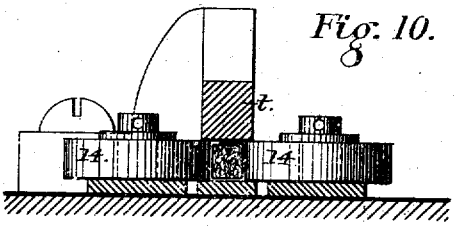
Fig. 10.
Witnesses:
S. B. Brewer,
A. Low
Inventors:
JAMES BURNS, AND
ALEXANDER BUCKMAN,
by William H. Low,
Attorney.

UNITED STATES PATENT OFFICE.

JAMES BURNS, OF BROOKLYN, AND ALEXANDER BUCKMAN, OF SCHODACK DEPOT, ASSIGNORS OF PART INTEREST TO JOHN S. BAKER AND ABRAM L. SCHERMERHORN, OF STUYVESANT, AND JAMES R. DOWNE AND FRANK P. HARDER, OF CASTLETON, NEW YORK.

CIGARETTE-MACHINE.

SPECIFICATION forming part of Reissued Letters Patent No. 10,428, dated December 18, 1883.

Original No. 259,090, dated June 6, 1882. Application for reissue filed April 14, 1883.

*To all whom it may concern:*

Be it known that we, JAMES BURNS, of Brooklyn, in the county of Kings and State of New York, and ALEXANDER BUCKMAN, of Schodack Depot, in the county of Rensselaer and State of New York, have invented certain Improvements in Cigarette-Machines, of which the following is a specification.

Our invention relates to improvements in machines for manufacturing a cigarette-stock in a continuous body or bar of the proper diameter for the finished cigarette, the said machines being also adapted to sever the said cigarette-stock automatically into merchantable cigarettes; and the objects of our improvements are, first, to effect the compression of the filling material directly into a continuous trough of wrapping material as contradistinguished from the usual mode of first compressing the filling material into the required form, and then covering it with the wrapping material; second, to effect by the same means the feeding of the tobacco and the compression of it into the cigarette-stock in the manner hereinafter set forth; and, third, to provide an automatic cutting device for severing the cigarette-stock into merchantable cigarettes, so arranged that its forward reciprocations will be made at a speed that is uniform with the forward movement of the cigarette-stock, and whose cutting movement is effected by the forward reciprocation of said device in the manner hereinafter described. These objects we attain by means of the mechanism illustrated in the accompanying drawings, which form part of this specification, and in which—

Figure 3:
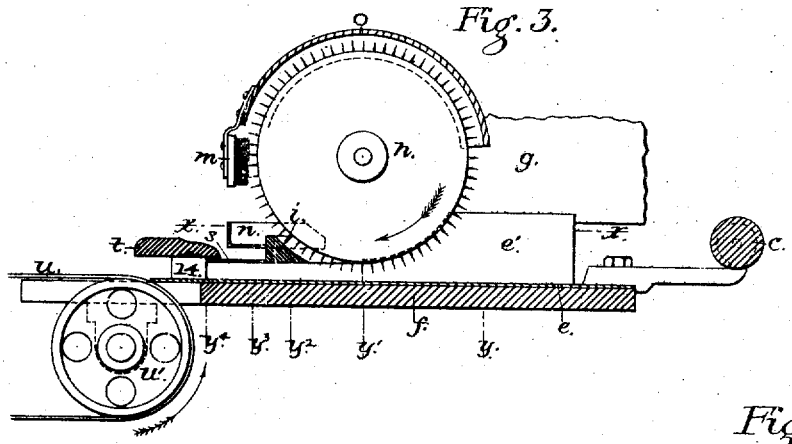
Figure 11:
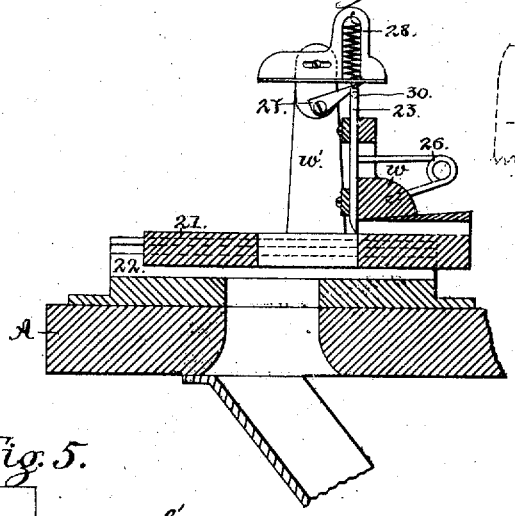
Figure 12:
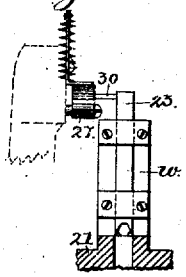
Figure 4:
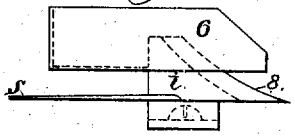
Figure 5:
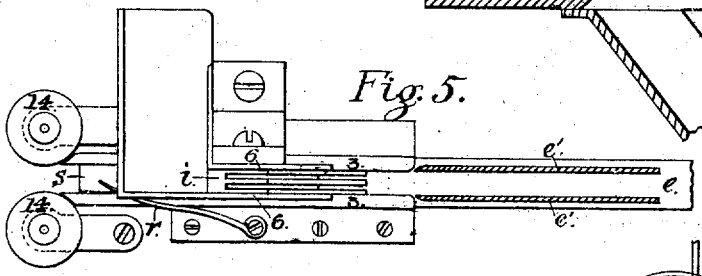
Figure 13:
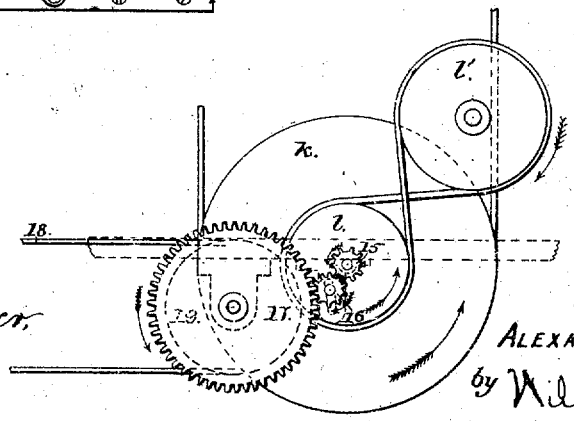

Figure 1 is a plan view of our cigarette-machine with the holding-bar removed; Fig. 2, a side elevation of the machine, with portions of a wheel and connecting-rod broken away for the purpose of exposing the more distantly located parts; Fig. 3, an enlarged side elevation of the tobacco feeding and compressing wheel and sections of the adjacent parts; Fig. 4, an enlarged side elevation of the tobacco stripping and forming device; Fig. 5, a plan view of the latter and adjacent parts below the line $x\ x$ on Fig. 3, the feeding-wheel being removed therefrom; Fig. 6, a transverse section through the wrapper, guide-plates, and hopper at the line $y$ on Fig. 3; Fig. 7, a like section through the filled trough of wrapper, lower edge of the feeding-wheel, and folders at the line $y'$ on Fig. 3; Fig. 8, a like section through the filled trough of wrapper, lower edge of the feeding-wheel, stripping device, and folders at the line $y^2$ on Fig. 3; Fig. 9, a like section through the filled trough of wrapper, folders, and folding-finger at the line $y^3$ on Fig. 3, with the first or pasted edge of the wrapper turned down; Fig. 10, a like section through the filled and closed wrapper and the second folding device at the line $y^4$ on Fig. 3, the side-compressing rollers being shown in elevation; Fig. 11, a longitudinal section of the cutting device; Fig. 12, a transverse section of the latter; Fig. 13, a skeleton view of the driving-pulleys and gearing; Fig. 14, a plan view of the endless belt for carrying the cigarette-stock, and Fig. 15 a transverse section of the carrying-belt and holding-bar.

We introduce a strip of paper, and, as it passes into the machine, the adhesive material is applied, near one edge, to the under surface. This becomes the outside wrapper. The paper is folded up into the shape of a trough. The tobacco, in proper condition, is passed in between guide-plates and fed along by a wheel, with pins in its periphery, and packed into the trough of paper beneath the cigarette-former, the pressure of the pins against the tobacco, causing it to move along through the former, and draw with it the paper wrapper. This insures uniformity in the cigarette-stock, because it only moves as fast as the tobacco is properly packed and moved along. The paper is closed up around the former and tobacco, the plain edge lapping upon the gummed edge, and the parts are held together while moving along on a belt, and then the strip is cut off in proper lengths by a vibrating knife.

As represented in the drawings, A is the bed of the machine, having at its rearmost end an adjustable bed or block that carries the standards $a'$, in which a roll of paper, $a$, for the wrapper of the cigarette-stock, is held so as to revolve on its journals. The paper $a$ is in a continuous length, and of proper width to encircle the cigarette-stock, in addition to a suitable allowance for a lap for receiving the adhesive preparation, whereby the two edges of the wrapper are secured together. From the roll the strip of paper $a$ first passes over a pasting device, which consists of a pasting-disk, $b$, and a supporting-roller, $b'$, both of the same diameter, fixed upon the same shaft, but with a slight space between them. The said shaft is carried in the standards $b^2$, which are secured upon an adjustable block, and upon the latter is fixed the trough $d$ for containing any suitable adhesive material. The edge of the pasting-disk $b$, which may be notched, runs in the adhesive material, and it is arranged to apply a line of the adhesive preparation upon the under side of the paper close to one of its edges. A scraper is arranged to remove the surplus paste from the edge of said disk. After passing over the pasting device, the strip of paper is carried forward under a guide-roller, $c$, and lies upon the guide-bar $e$, that is fixed upon the table $f$ and extends forward until it meets the rearmost ends of the folders, hereinafter described. The said guide-bar is a little wider than the diameter of the finished cigarette-stock, and for this reason the paper can be fed forward without having its pasted edge brought into contact with anything. In this condition the paper is moved forward beneath the stationary guide-plates $e'$, that extend downward below the hopper $g$ for containing the tobacco. Next forward of the guide-plates $e'$ the folders 3 are secured to the table $f$. The said folders have rounded or inclined ends that are adapted to turn the edges of the paper without interfering with the pasted portion of it. One of said folders is L-shaped. Its horizontal flange, being uniform in thickness with the guide-bar $e$, forms a continuation of said guide-bar. The said folders, being secured to the table $f$ by means of screws, can be readily removed for the purpose of cleaning, when needed. The guide-plates $e'$ extend forward to the tobacco-feeding wheel $h$, and their forward ends are curved to fit against the periphery of said wheel. Around the wheel $h$ there is fixed a great number of immovable radial pins, which are preferably arranged in two peripheral rows, as shown in Figs. 7 and 8. The said pins serve to draw down and force forward into the trough of paper beneath the cigarette-former $i$ the tobacco that is fed by hand into the hopper $g$. The pins in the feeding-wheel $h$ are not of sufficient length to touch the paper lying in the folders 3. The feeding-wheel $h$ may be driven by any suitable means, and we have shown for that purpose a driving-pulley, $k$, with a cross-belt from the pulley $l$ to the pulley $l'$, fixed on the shaft of said wheel.

The cigarette-former or stripping device $i$ performs several duties. It strips the tobacco from the pins of the feeding-wheel $h$; it holds down the tobacco that is compressed beneath it in the trough of wrapper, and is a guide over which the edges of the wrapper are folded down to their places. The said former has two plates, 6, which extend back at each side of the feeding-wheel $h$, and it also has a concave edge, 8, adapted to fit the curvature of the periphery of said feeding-wheel, and in this concave edge slotted openings are formed, which are just wide enough to permit the pins in the wheel $h$ to pass through, but the tobacco on said pins will be stripped therefrom by the ribs at each side of said openings, and the former $i$ will thus strip off and retain beneath itself about all of the tobacco carried in by the pins of the feeding-wheel; but to insure a perfect cleanliness of the parts, a stationary brush, $m$, is fixed against the rising side of said wheel over the former $i$, so as to remove any particles of tobacco that may adhere to the pins or to the periphery of the feeding-wheel. These particles will fall into the box $n$, from whence they may be readily removed by hand. A guard, $o$, fixed over the top of the feeding-wheel $h$, protects the attendant against being injured by the pins in said wheel. The wheel $h$ is rotated in the direction indicated by the arrow marked thereon in Fig. 3, and by so doing the pins in its periphery will press the tobacco forward into the space underneath the lower face of the former $i$, so that it (the tobacco) will be compressed directly into the part of the trough of wrapper that is then lying in the folders 3 beneath the said former. The transverse form of the cigarette-stock, as made by our machine, is square, and the former $i$, being above the tobacco, holds it down in the trough of wrapper, while the consolidating-wheels 14 compress and consolidate the tobacco sidewise as the cigarette-stock, in being fed forward, passes between them. A thin plate, $s$, forms a forward extension of the former $i$ on a line with its lower face, and over the top of said plate a finger, $r$, is so arranged that as the cigarette-stock is fed forward the pasted edge of the wrapper will thereby be turned over inwardly onto the plate $s$; then, as the forward movement of the cigarette-stock is continued, the other edge of the wrapper is, by means of the presser-arm $t$, turned over inwardly onto the pasted edge in such manner that the two edges will adhere to complete the formation of a continuous tube of paper containing a filling of properly-compressed tobacco, and which for convenience is herein designated as the cigarette-stock. As fast as it is finished, the cigarette-stock is passed forward through a groove in the under face of the holding-bar $v$, and upon the surface of the elastic endless belt $u$, wherein the cigarette-stock is retained a sufficient time for the adhesive material to set so as to hold the two edges of the wrapper together.

The peripheral speed of the wheel $h$ is greater than the speed of the forward movement of the cigarette-stock, and for that reason the pins in said wheel will press the tobacco forward, so as to pack it into that part of the trough of wrapper that is then lying under the former *i*, and as fast as the tobacco becomes sufficiently compacted therein the pressure exerted by the said pins against the tobacco will cause it and its inclosing-wrapper to move forward through the machine. This forward movement is materially aided by the endless belt *u*, to which an independent motion is given by means of the pulleys *u'* and *u²*, the first of which is driven by the gears 15, 16, and 17, and the other by the belt 18 and pulleys 19 and 20. The gear-wheel 17 and pulley 19 are, preferably, made as one piece. The gear-wheel 15 is secured to the driving-shaft in such manner that it can be removed therefrom, so as to substitute a larger or smaller one when it is desired to increase or diminish the speed of the belt *u*, and the stud for the gear-wheel 16 is adjustable in a slot, so as to place it in position to suit the size of the wheel 15 used. The latter, by containing a greater or lesser number of teeth, gives, in a corresponding manner, more or less movement to the belt *u* between the reciprocations of the knife for cutting up the cigarette-stock into merchantable cigarettes, and consequently the length of the cigarettes can be varied at option. The endless belt *u* is supported at intervals upon the rollers *q*, for the purpose of keeping the cigarette-stock in the groove in the under edge of the holding-bar *v*. The said belt has blocks of rubber, *u³*, secured to its surface, as shown in Fig. 14, to form a groove for containing the cigarette stock in such manner that the latter will have its sides gripped by the edges of said blocks, so that its movement will be more steady and certain.

The cigarette-stock is cut into the lengths required by means of a reciprocating cutting mechanism, which is adapted to move at about the speed at which the cigarette-stock is fed forward, and for this reason the cutting is effected without injuring the wrapper. The said cutting mechanism consists of the following parts: A reciprocating head, 21, slides in guides 22, fixed on the bed A of the machine. A vertically-sliding cutter, 23, having a Λ-shaped or concave cutting-edge, so as to effect the cutting off of the cigarettes without opening the pasted lap of the wrapper, is fitted to slide in guides formed on the cutter-stock *w*, which is fixed upon and moves with the head 21, and the latter is connected, by means of the rod 25, to a wrist-pin, 24, adjustably fixed in a slotted opening in a wheel, 31, secured to the driving-shaft, and the adjustability of the said wrist-pin affords the means for increasing and diminishing the movement of the reciprocating head 21. The cutter 23 is held up to its normal position by a spring, 26, and, as the head 21 moves forward, a pin, 30, projecting from the side of said cutter, engages under the inclined face of the switch-cam 27, and thereby the cutter 23 is forced downward, to effect the cutting off of the cigarettes. The forward end of said switch-cam is pivoted to a stationary bracket, *w'*, and its rear end is held up by a spring, 28. As soon as the pin 30 has passed beyond the forward end of the switch-cam, the spring 26 raises the cutter 23 before the head 21 begins its return movement, and the cutter is maintained in its highest position while the said head is moving rearward, so that its cutting-edge will be kept clear from the cigarette-stock, and in effecting this rearward movement the pin 30 will pass above the switch-cam 27, whose rearmost end swings down to let the said pin pass by it. The severed cigarettes drop through an opening in the head 21 into a suitable receptacle that is placed underneath the machine to receive them.

We claim as our invention—

1. In a cigarette-machine, the combination, with a tobacco-feeding wheel provided with immovable radial pins, as herein described, of a combined tobacco stripping and holding-down device having slotted openings, as herein set forth, the said tobacco stripping and holding-down device being arranged, as described, in relation to the tobacco-feeding wheel, the mechanism for forming a trough form of wrapping material, and means for retaining the tobacco in a compressed condition until the trough of wrapping material is properly filled, as herein specified.

2. In a cigarette-machine in which a roll of paper is employed, the combination, with a pasting device, constructed as herein described, for applying a line of adhesive material along the edge of said paper, of a tobacco-feeding wheel provided with immovable radial pins, a tobacco-hopper provided with guide-plates for directing the tobacco onto the pasted paper, a folding mechanism, as described, for forming said paper into a trough for receiving the filling of tobacco, and a stripping and holding-down device provided with slotted openings for the passage of the radial pins of the tobacco-feeding wheel, substantially as specified.

3. In a cigarette-machine, the combination, with the mechanisms herein described for forming the paper into a tube and filling and moving the same, of a grooved holding-bar and an endless feeding-belt, as and for the purposes herein specified.

4. In a cigarette-machine, a cutting device consisting of a horizontally-reciprocating head provided with a vertically-reciprocating knife, which is retained in its normal position by means of a spring, as herein described, in combination with a switch-cam that is pivoted to a stationary portion of the machine, and adapted to force down the knife while the reciprocating head is moving in the same direction with the cigarette-stock, as and for the purpose herein specified.

5. In a cigarette-machine, the combination, with a tobacco-feeding wheel provided with fixed radial pins, and a combined stripping and forming device provided with slotted openings for the passage of said pins, of the folders for forming the trough form of wrapper, and consolidating-wheels for compressing the cigarette-stock sidewise, as herein specified.

6. In a cigarette-machine, the combination, with a feeding-wheel provided with radial pins, and a former, *i*, having slots for the passage of said pins, of the folders 3 and folding-finger *r*, as and for the purposes set forth.

7. In a cigarette-machine, the combination of the holding-bar *v* and the endless belt *u*, having blocks or pieces of rubber $w^3$ upon its surface, for the purposes substantially as specified.

JAMES BURNS.
ALEXANDER BUCKMAN.

Witnesses:
WM. H. LOW,
S. M. TYLER.